United States Patent [19]
Rhoton et al.

[11] Patent Number: 5,692,840
[45] Date of Patent: Dec. 2, 1997

[54] CRASH TOLERANT AIR BEARING SPINDLE

[75] Inventors: Jeffrey K. Rhoton, San Ramon; Roger D. Peters, San Francisco, both of Calif.

[73] Assignee: Phase Metrics, San Diego, Calif.

[21] Appl. No.: 766,171

[22] Filed: Dec. 12, 1996

[51] Int. Cl.⁶ .................................................. F16C 23/04
[52] U.S. Cl. ................................... 384/110; 384/208
[58] Field of Search ............................. 384/110, 115, 384/208, 209, 206, 213

[56] References Cited

U.S. PATENT DOCUMENTS

| | | | |
|---|---|---|---|
| 5,113,104 | 5/1992 | Blaettner et al. | 384/210 |
| 5,447,376 | 9/1995 | Cunningham | 384/214 |

*Primary Examiner*—Lenard A. Footland
*Attorney, Agent, or Firm*—Blakely Sokoloff Taylor & Zafman

[57] ABSTRACT

A rugged spindle for a disk certifier that test the disks of a hard disk drive. The spindle contains a first bearing and a second bearing that are coupled together by a shaft. The first bearing is coupled to a chuck that captures a disk. The second bearing is coupled to the spindle shaft of an electric motor which rotates the disk. The bearings each contain an outer graphite sheath that is separated from a hardened housing by an air bearing. The connecting shaft is bonded to the first and second bearings by an adhesive that is injected through longitudinal passages of the shaft. The bonding adhesive flows along the interface of the connecting shaft and bearings until the adhesive fills an indicator slot of the shaft. Air bearings are created during the bonding process of the second bearing to insure an accurate relationship between the two bearings and the housing.

8 Claims, 3 Drawing Sheets

CRASH TOLERANT AIR BEARING SPINDLE

BACKGROUND OF THE INVENTION

1. Field of the Invention

The present invention relates to air bearing spindles used for disk media test equipment such as disk certifiers.

2. Description of Related Art

Hard disk drives contain magnetic recording heads that magnetize and sense the magnetic field of rotating disk(s). Each disk is constructed from a substrate that is coated with magnetic material. Manufacturing tolerances and process variations may vary the magnetic properties of the disks. It is desirable to test the disks to insure compliance with design specifications.

The disks are typically tested on an apparatus commonly referred to as a disk certifier in a process commonly referred to as "disk certification". Disk certifiers commonly use a spindle to rotate the disk under test adjacent to a magnetic recording head. The spindles used to spin a disk usually employ an air bearing due to the tight tolerances necessary for disk certification. The recording head writes and then reads data from the rotating disk. The data is then analyzed by circuitry to determine whether the disk meets design specifications.

The disks are typically mounted onto the spindle by a robotic arm. There is a concern that the robotic arm may strike and damage the spindle. A damaged spindle may wobble, creating a run-out in the disk which reduces the accuracy of the test. The disk run-out will reduce the accuracy of the test. Furthermore, as test tolerances increase to keep pace with higher recording densities, air bearing spindles must spin the disks with high precision. Indeed, air bearing spindles are typically the single most expensive piece of hardware on disk test apparatus. It is therefore desirable to provide a spindle that is rugged enough to withstand the force of a robotic arm or other abuses to the spindle motor during the process of disk certification.

SUMMARY OF THE INVENTION

The present invention is a rugged air bearing spindle for a disk certifier that tests the disks of a hard disk drive. The spindle contains a first bearing and a second bearing that are coupled together by a shaft. The first bearing is coupled to a chuck that captures a disk. The second bearing is coupled to the spindle shaft of an electric motor which rotates the disk. The bearings each contain an outer graphite sheath that is separated from a hardened housing by an air bearing. The connecting shaft is bonded to the first and second bearings by an adhesive that is injected through longitudinal passages of the shaft. The bonding adhesive flows along the interface of the connecting shaft and bearings until the adhesive fills an indicator slot of the shaft. Air bearings are created during the bonding process of the second bearing to insure an accurate relationship between the two bearings and the housing. The graphite sheath and bonded shaft provide a rugged bearing assembly that can withstand relatively large external forces such as a robotic arm striking the spindle.

DETAILED DESCRIPTION OF THE INVENTION

Figure 1:
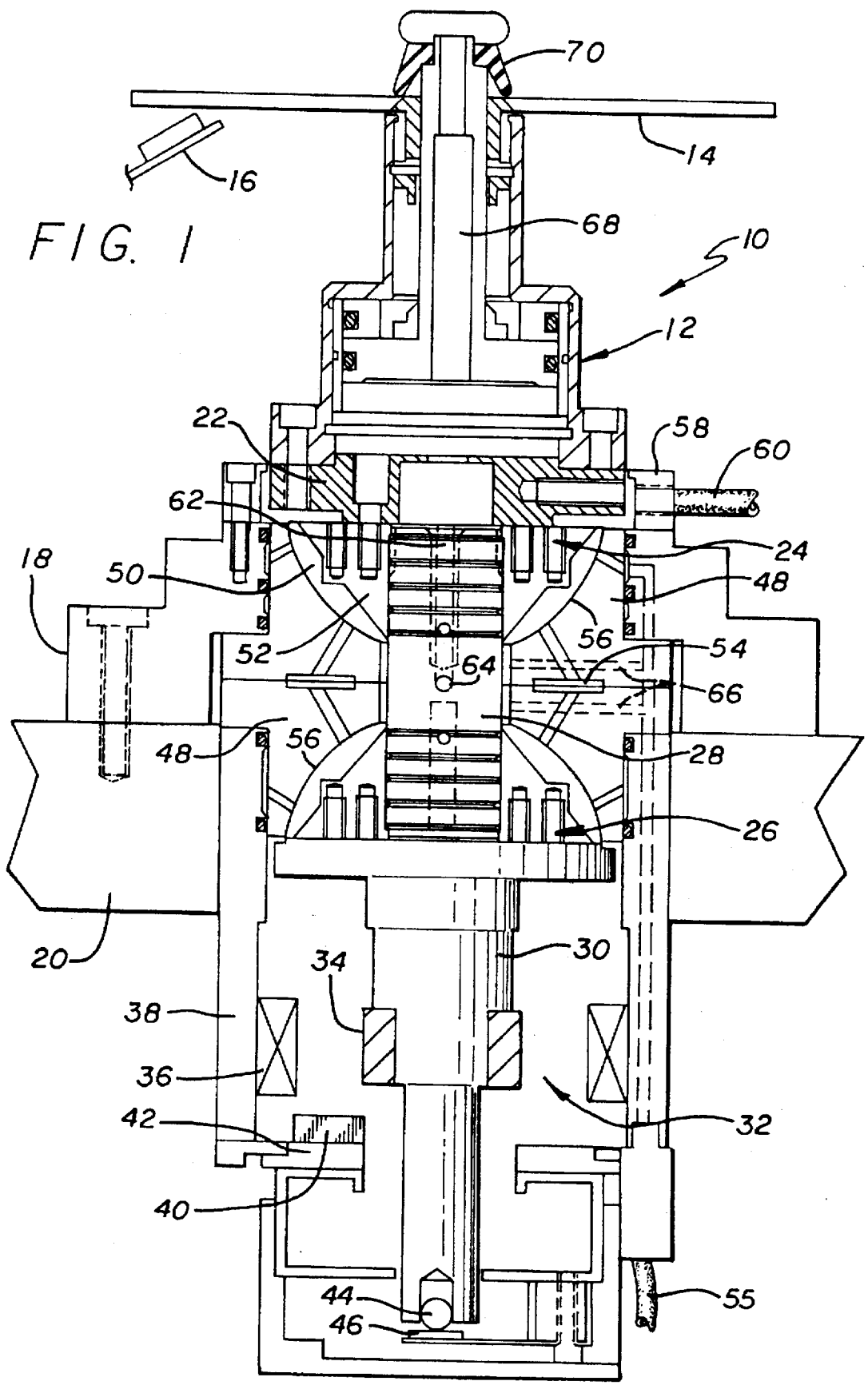
FIG. 1 is a cross-sectional view of a spindle of the present invention.

Referring to the drawings more particularly by reference numbers, FIG. 1 shows a spindle 10 of the present invention. The spindle 10 includes a chuck 12 that captures a magnetic disk 14. The motor 10 rotates the disk 14 relative to a magnetic recording head 16. The recording head 16 magnetizes and then senses the magnetic fields of the disk 14 in accordance with a disk certification test routine. The motor 10 may contain an outer housing collar 18 that is bolted to a table 20.

The chuck 12 is fastened to a mounting plate 22 that is attached to a first bearing 24. The first bearing 24 is connected to a second bearing 26 by a shaft 28. The second bearing 26 is attached to a spindle shaft 30 of an electric motor 32.

The electric motor 32 includes a magnet assembly 34 that is attached to the spindle shaft 30 and coupled to a coil assembly 36. The coil assembly 36 is fastened to an outer motor housing 38. The motor 32 rotates the spindle shaft 30, bearings 24 and 26 and chuck 12 to spin the disk 14. The motor 32 may have an encoder 40 that is mounted to an end plate 42. The end plate 42 can be rotated to adjust the position of the encoder 40. The spindle 30 is in contact with a ground button 44 that is connected to a grounding plate 46.

The bearings 24 and 26 rotate relative to a housing 48. The bearings 24 and 26 are each constructed as a segment of a sphere that is located within corresponding spherical shaped openings of the housing 48. The housing 48 preferably has a hard anodized outer surface. The bearings 24 and 26 preferably contain an outer graphite sheath 50 that is bonded to an inner core 52. The graphite sheath 50 and anodized housing 48 provide hard surfaces that can withstand relatively large impact forces.

The housing 48 has a plurality of air bearing channels 54 that are in fluid communication with a positive air pressure hose 55. The hose 55 provides air pressure that creates air bearings 56 between the housing 48 and the bearings 24 and 26. The motor 10 may have a vacuum gland 58 that is mounted to the outer collar 18. The vacuum gland 58 is attached to a vacuum hose 60. The vacuum hose 60 provides a return line for the air of the air bearings 56. The vacuum line 60 will also draw out any particles that are created by the bearing surfaces of the motor 10 to insure that the disk 14 is not contaminated.

The connecting shaft 28 may have a longitudinal air passage 62 that is in fluid communication with a pair of outer openings 64 located on opposing sides of the shaft 28. The outer openings 64 are in fluid communication with air channels 66 that are coupled to a positive air supply. The positive air supply can provide air pressure which actuates a piston 68 within the chuck 12. Actuation of the piston 68 moves a rubber collar 70 in an upward direction and releases the disk 14. When the air pressure is terminated the collar 70 returns to grasp the disk 14.

To assemble the motor 10 the inner cores 52 are bonded to the outer graphite sheaths 50 to create the first 24 and second 26 bearings. The cores 52 are typically bonded to the sheaths 50 with an epoxy material. The sheaths 50 may be initially provided in a cylindrical shape and then machined to the spherical shape after the inner cores 52 have been bonded thereto.

Figure 2:
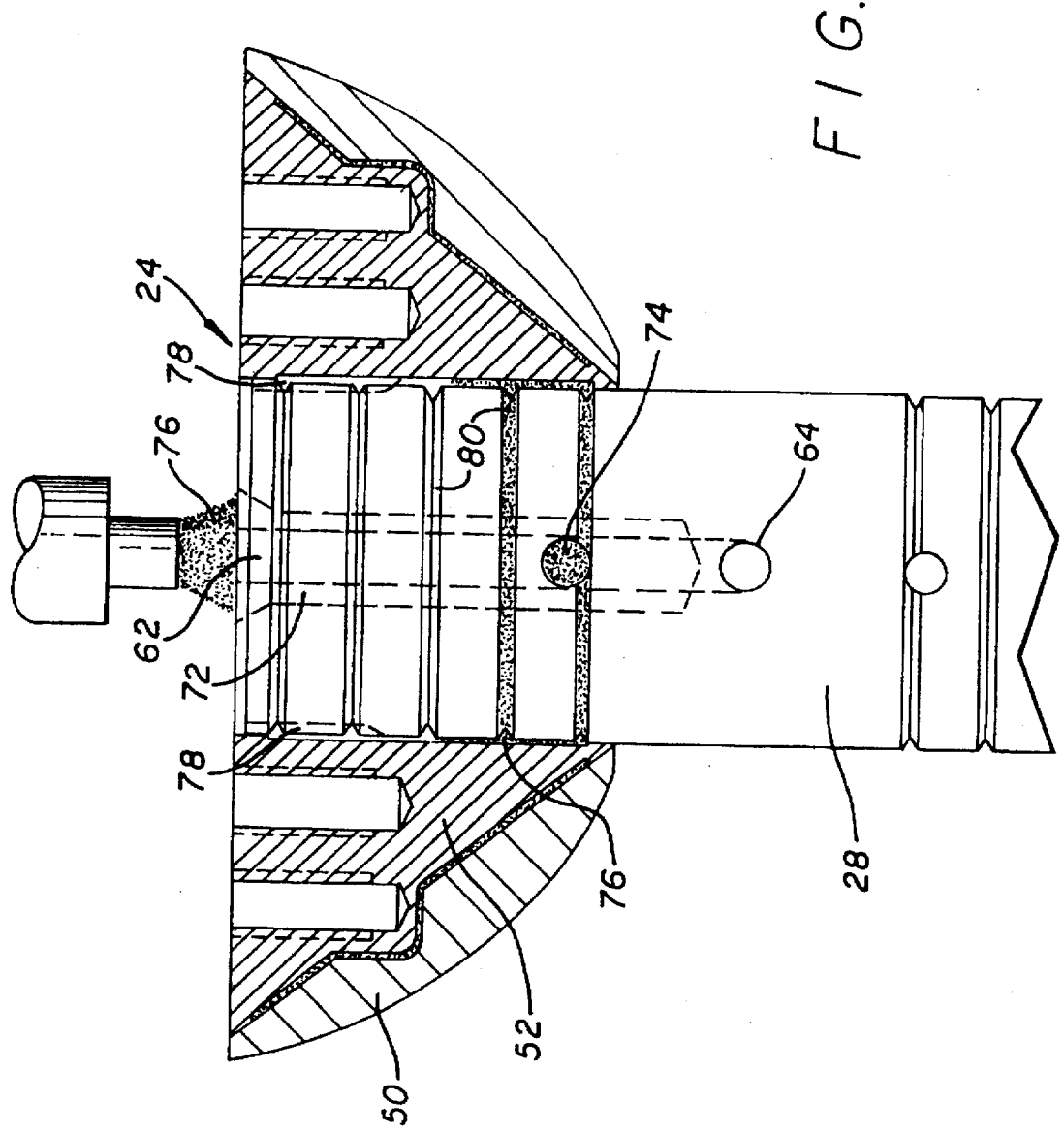
FIG. 2 is a cross-sectional view showing a first bearing being attached to a shaft.

As shown in FIG. 2, the shaft 28 is inserted into the first bearing 24. The connecting shaft 28 has a pair of longitudinal holes 72 that are in fluid communication with a plurality of fill ports 74 located on opposite sides of the shaft 28. An adhesive 76 is injected into the hole 72 of the shaft 28. The adhesive 76 flows through the fill port 74 and up across the space between the first bearing 24 and the shaft 28. Injection continues until the adhesive 76 fills a pair of slots 78 of the shaft 28. The adhesive 76 is preferably an epoxy that cures at room temperature. The connecting shaft 28 preferably contains a plurality of grooves 80 that increase the bonding strength between the shaft 28 and the bearings 24 and 26.

Figure 3:
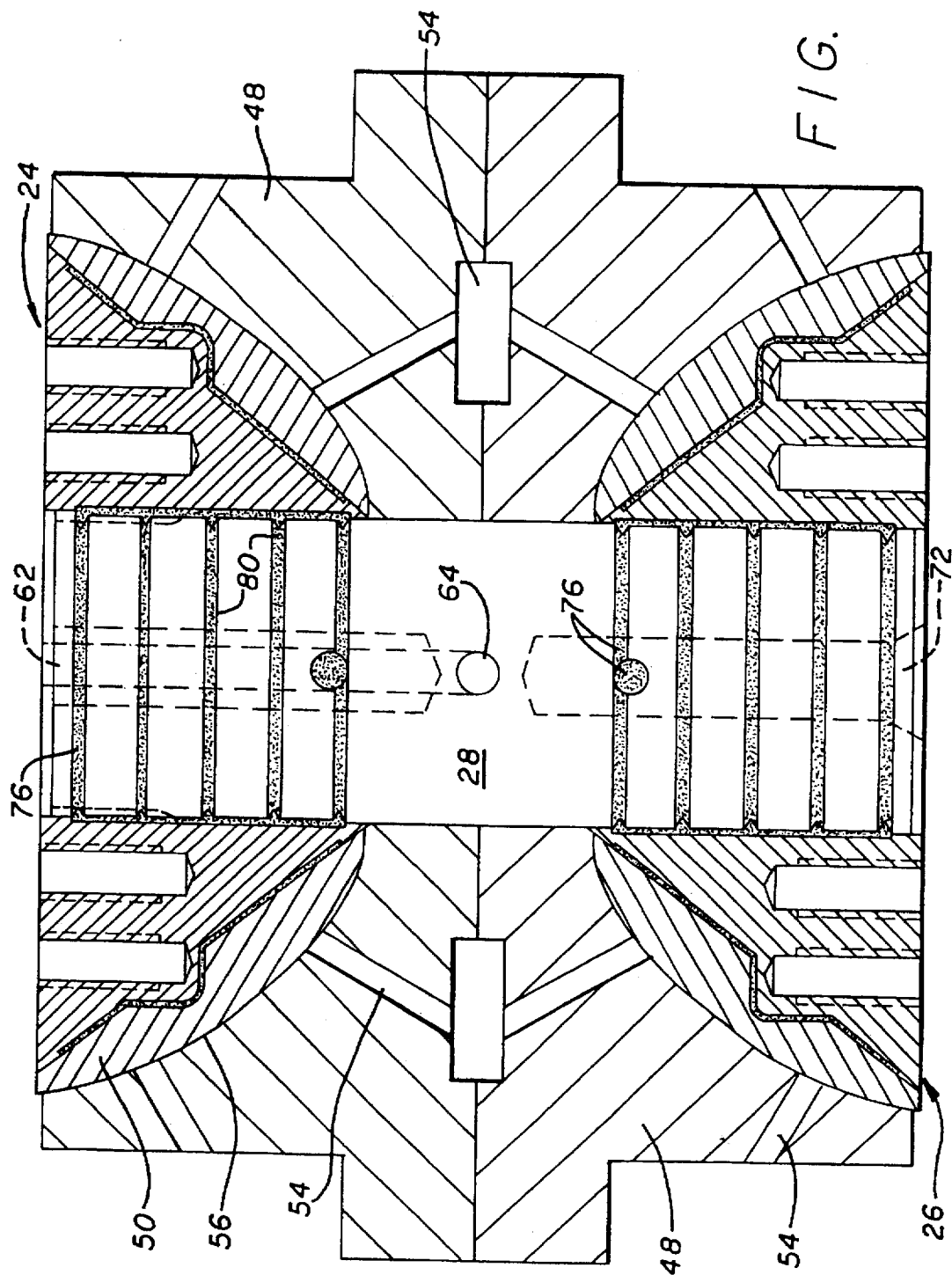
FIG. 3 is a cross-sectional view showing a second bearing being attached to the shaft.

As shown in FIG. 3, the first bearing 24 is placed into the housing 48 and the second bearing 26 is slid onto the shaft 28. The housing 48 is preferably constructed from two separate pieces that are bolted together before the bearings are placed into the bearing openings.

Air pressure is then provided to create an air bearing between the bearings 24 and 26 and the housing 48. A tooling fixture (not shown) is provided to hold the second bearing 26 in place. Adhesive is then injected into the longitudinal passage 72 to bond the second bearing 26 to the shaft 28. Bonding the second bearing 26 while the air bearings are formed insures an accurate air bearing gap between the bearings 24 and 26 and the housing 48 in the final assembly. The bearing assembly is then assembled to the remaining portions of the motor 10. The bonding process creates a rigid coupling of the first bearing 24 and the second bearing 26 that can withstand relatively large impact forces.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Although use of one spindle in a disk certifier is shown and described, it is to be understood that the spindle may be used in other systems such as a servowriter for writing servo information onto a disk.

What is claimed is:

1. A spindle comprising:

a housing;

a first bearing that is supported by said housing, said first bearing being shaped as a segment of a sphere;

a shaft that is bonded to said first bearing;

a second bearing that is bonded to said shaft, said second bearing being shaped as a segment of a sphere; and, a motor coupled to said second bearing.

2. The spindle as recited in claim 1, wherein said first and second bearings each include an outer sheath.

3. The spindle as recited in claim 2, wherein said first and second bearings each include an inner core that is bonded to said outer sheath.

4. The spindle as recited in claim 1, wherein said first and second bearings are each separated from said housing by an air bearing.

5. The spindle as recited in claim 1, wherein said shaft has an internal air passage.

6. The spindle as recited in claim 1, wherein said shaft includes a plurality of grooves.

7. The spindle as recited in claim 1, wherein said shaft includes an outer slot.

8. The spindle as recited in claim 1, further comprising a vacuum gland that is mounted to said first bearing and coupled to a vacuum source.

* * * * *